United States Patent [19]
Steffen

[11] Patent Number: 6,123,158
[45] Date of Patent: Sep. 26, 2000

[54] ELECTRIC TOOL WITH DUCTED COOLED CONTROL ELECTRONICS

[75] Inventor: Michael Steffen, Gauting, Germany

[73] Assignee: Wacker-Werke GmbH & Co., KG, Germany

[21] Appl. No.: 09/230,624
[22] PCT Filed: Jul. 30, 1997
[86] PCT No.: PCT/EP97/04130
   § 371 Date: Jan. 25, 1999
   § 102(e) Date: Jan. 25, 1999
[87] PCT Pub. No.: WO98/06245
   PCT Pub. Date: Feb. 12, 1998

[30] Foreign Application Priority Data

Aug. 3, 1996 [DE] Germany .................. 196 31 517

[51] Int. Cl.$^7$ .................................................. B25D 13/00
[52] U.S. Cl. ........................ 173/217; 173/117; 173/170
[58] Field of Search .................... 173/217, 171, 173/117, 162.2, 2, 170; 318/700

[56] References Cited

U.S. PATENT DOCUMENTS

| | | | |
|---|---|---|---|
| 3,430,709 | 3/1969 | Miller | 173/117 |
| 3,718,193 | 2/1973 | Wanner | 173/117 |
| 3,824,417 | 7/1974 | Moores, Jr. | 173/117 |
| 4,094,365 | 6/1978 | Wanner | 173/117 |
| 4,156,468 | 5/1979 | Stiltz et al. | 173/117 |
| 4,489,261 | 12/1984 | Hartwig et al. | 318/700 |
| 4,601,351 | 7/1986 | Hartwig et al. | 173/117 |
| 4,711,308 | 12/1987 | Blaas et al. | 173/162.2 |
| 4,766,963 | 8/1988 | Hartwig et al. | 173/117 |
| 5,014,794 | 5/1991 | Hansson et al. | 173/2 |
| 5,165,488 | 11/1992 | Liu | 173/117 |

FOREIGN PATENT DOCUMENTS

| | | |
|---|---|---|
| 0 283 945 | 9/1988 | European Pat. Off. . |
| 0 298 278 | 1/1989 | European Pat. Off. . |
| 31 47 500 | 6/1983 | Germany . |
| 39 13 971 | 11/1989 | Germany . |
| 40 00 861 | 7/1991 | Germany . |
| 42 11 316 | 10/1993 | Germany . |
| 296 00 191 | 2/1996 | Germany . |
| 2111773 | 12/1982 | United Kingdom . |
| 2 214 722 | 9/1989 | United Kingdom . |

*Primary Examiner*—Peter Vo
*Assistant Examiner*—Jim Calve
*Attorney, Agent, or Firm*—Boyle Fredrickson Ziolkowski S.C.

[57] ABSTRACT

In a hand-held electric tool driven by an electric motor (2) and capable of being connected to a single-phase alternating current (4a), the electric motor (2) has no collector or slip ring, and its driving energy is supplied by control electronics (5) which are powered at their input by the single-phase alternating current (4a) and which supply at their output the type of current (4b) suitable for the motor. The control electronics (5) are arranged in a handle (1a) of the electric tool and are cooled by the cooling air flow (7) which also cools the motor (2).

19 Claims, 1 Drawing Sheet

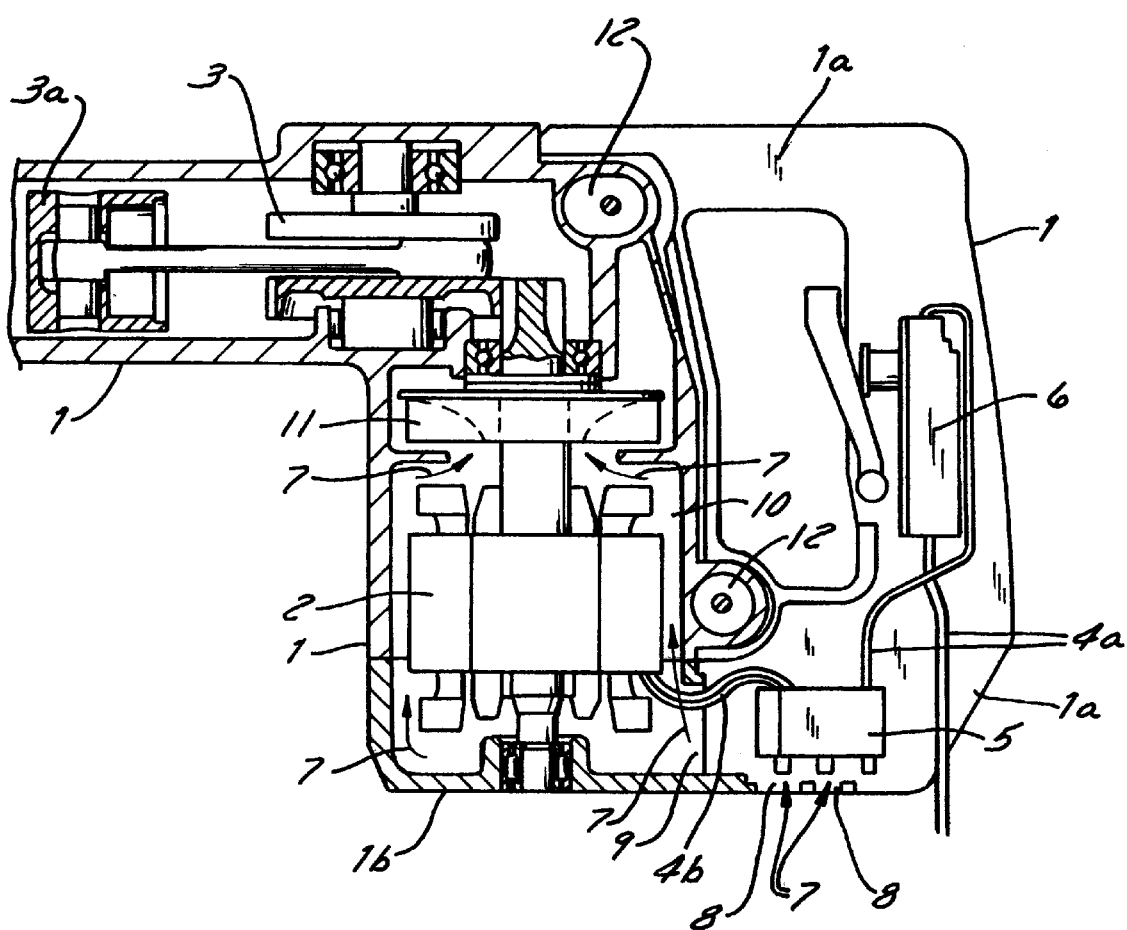

ELECTRIC TOOL WITH DUCTED COOLED CONTROL ELECTRONICS

BACKGROUND OF THE INVENTION

The invention relates to an electric tool which is driven by an electric motor 1.

Electric tools of this type are known.

In the known electric tools of the generic type, the variable-speed drive is realised as a rule by via a collector motor whose drive voltage is set in a fashion guided either by speed or by value prescription, and is thus adjusted to a desired speed.

The current is fed to the collector of the collector motor via carbon brushes, with the result that both the collector and the carbon brushes are subjected in practice to substantial wear and, because of the unavoidable considerable heating of the collector under the flow of current between the brushes and the collector, the rotor winding is at risk of failure through overheating and vibrational damage, and constitutes the thermally most critical component in the known electric tools.

It is known that, by contrast with collector motors, three-phase ac motors (asynchronous or synchronous motors), magnetic motors and reluctance motors are considerably lower in wear, and that their thermal loading is substantially easier to manage in operation than that of collector motors. Hitherto, the use of three-phase ac motors in electric tools of the aforementioned type has so far been out of the question, because three-phase current is frequently not present at the place of use, or at least is not available at the required voltage and/or frequency (for example 250 V/200 Hz; 42 V/200 Hz).

OBJECT AND SUMMARY OF THE INVENTION

It is the object of the invention to create an electric tool of the generic type described above which is distinguished by a susceptibility to wear and thermal loading of its electric motor which is lower by contrast with the known tools of the generic type, as well as by a robust and maintenance-free design and, in addition, is configured such that there is no risk of any sort of overheating even for the components provided for supplying the drive energy for the electric motor in the tool housing.

The above object is achieved by mounting the frequency converter in a handle part of the motor housing in a location in which a cooling surface of the frequency converter is located in a cooling air path that extends through the handle part, over the cooling surface of the frequency converter, and into the motor compartment.

In the case of the electric tool in accordance with the invention, because of the inventive installation in the housing of the tool of an electronic control system which is fed on the input side with the single-phase alternating current and supplies the type of current required by the motor on the output side, virtually any brushless and slipring-less and thus wear-resistant and heat-resistant electric motor can be used as a drive motor, and the electronic control system is moreover, according to the invention, installed in the tool housing in such a way that for it, as well, the risk of overheating is reliably excluded.

BRIEF DESCRIPTION OF THE DRAWINGS

The invention is explained in more detail below with the aid of the drawing and with reference to an exemplary embodiment. The sole FIGURE of the drawing shows the tool in a diagrammatic representation in longitudinal section.

DETAILED DESCRIPTION OF THE PREFERRED EMBODIMENTS

The tool represented in the drawing is a percussion hammer/hammer drill which has a housing 1 in which there is installed an electric motor 2 which drives the percussion mechanism 3a, which is provided with a crank mechanism 3, is not shown in more detail, and can be of known design.

The electric motor 2 is a brushless and slipring-less motor which obtains its drive energy from an electronic control system 5 which on the input side is fed with the single-phase alternating current 4a, and on the output side supplies the type of current 4b required by the motor, a hand-operated switch 6 being connected upstream of the electronic control system 5 for the purpose of switching the motor 2 on and off.

The electric motor 2 can be of any known design of speed-controlled brushless and slipring-less electric motors. For example, it could compromise a reluctance motor or a three-phase ac motor. The electronic control system 5 may be set up and, for example, controlled by a microprocessor in such a way that the respective motor receives from it the type of current 4b required for its operation. In connection with the use of a three-phase ac motor as electric motor 2, the electronic control system 5, fed on the input side with single-phase alternating current 4a, would supply on the output side a three-phase current of a frequency which can preferably be varied in a controlled fashion and is preferably higher than the line frequency, and could be realised in the form of a frequency converter of known design. However, the frequency converter must be of miniaturised design, since it is to be accommodated in the electric tool, which may have only a limited weight and a limited size for ease of handling.

The electronic control system 5 is installed in the housing 1 of the tool such that it is in direct thermal exchange with a motor housing 1b surrounding the motor 2 when the motor housing 1b consists of metal, and/or is arranged, as represented in the FIGURE, in a cooling air path or stream 7 of the electric motor 2. For the last named purpose, the electronic control system 5 is installed in a handle part 1a of the tool housing 1 such that the cooling air stream 7 of the motor 2 is led at least partially through the handle 1a via the electronic control system 5, for which purpose it blows into the handle part 1a through openings 8 therein. After passing over the electronic control system 5 through an opening 9 in the wall of the motor compartment that faces the handle part 1b. The cooling air path or stream 7 terminates in the motor compartment 10, in front of the handle part 1a into the motor compartment 10, the cooling air stream is then led over the motor 2 in order to cool the latter as well. The cooling air stream is produced by a fan impeller 11 seated on the motor shaft 2a.

In the embodiment shown in the FIGURE, the entire electronic control system 5 is arranged in the cooling air stream 7. As an alternative to this, it is also possible to arrange only one cooling surface on a part of the cooling surface of the electronic control system 5 in the cooling air stream 7, while the actual electronic components are arranged at a location outside the cooling air stream 7.

As already described—the housing 1 is essentially formed by the motor housing 1b and the handle part 1a, which constitute two separate components which can be connected to one another. The motor housing 1b is produced from metal or plastic, while the handle part 1a consists of plastic. This ensures thermal decoupling of the handle part 1a from the motor housing 1b, which heats up more strongly.

The electronic control system 5 is preferably installed in a vibration-dampened fashioned in the tool housing 1 and the handle part 1a, so that no vibrations which could damage it are transmitted to it from the percussion mechanism 3a and from the tool (not represented), via housing 1.

The separation of the housing 1 into motor housing 1b and handle part 1a renders it possible for this purpose to connect the motor housing 1b and the handle part 1a by vibration dampers 12, for example, rubber buffers. In the electric tool shown in the figure, two rubber buffers are arranged on each of the two outer sides of electric tool two between the motor housing 1b and the handle part 1a. Hence four rubber buffers are provide in all. The rubber buffers 12 constitute a mechanical decoupling and ensure vibration-damping of the handle part 1a, as a result of which, in particular, the electronic control system 5 located in the handle part 1a is protected.

Moreover, it is also possible to provide vibration-damping at the frequency converter itself, that is to say at the electronic control system 5.

What is claimed is:

1. A hand-held electric tool comprising:
   a housing and an electric motor that is disposed in the housing and that can be connected to single-phase alternating current, wherein
      the electric motor is a brushless and slipring-less motor which obtains its drive energy from a frequency converter, wherein the frequency converter is fed on an input side thereof with a single-phase alternating current, supplies the type of current required by the motor on an output side thereof, and drives the electric motor with an electric current of higher frequency than line frequency;
   the housing of the electric motor tool has a motor housing part and a handle part;
   the frequency converter is arranged in the handle part; and
   at least a portion of a cooling air path of the motor extends across the motor, through an opening in the motor housing part adjacent the handle part, and through an opening in an exterior surface of the handle part and over a cooling surface of the frequency converter.

2. The electric tool as claimed in claim 1, wherein the motor housing part and the handle part are separate components which are connected to one another.

3. The electric tool as claimed in claim 2, wherein the motor housing part is produced from at least one of metal and plastic, and the handle part is produced from plastic.

4. The electric tool as claimed in claim 1, wherein the motor housing part and the handle part are connected to one another by a vibration damping device.

5. The electric tool as claimed in claim 1, wherein the frequency converter is installed on the handle part in a vibration-dampened fashion relative to the motor housing part.

6. The electric tool as claimed in claim 1, wherein the frequency converter is configured such that it permits controlled variable setting of the speed of the electric motor.

7. The electric tool as claimed in claim 1, wherein the electric motor is a three-phase ac motor.

8. The electric tool as claimed in claim 1, wherein the electric motor is a reluctance motor.

9. A hand-held electric tool comprising:
   an electric motor,
   a housing including a motor housing part, a handle part, and a divider disposed between the motor housing part and the handle part, a motor compartment being formed in the motor housing part and housing the electric motor, and a cooling air path extending from an inlet opening in an exterior surface of the handle part, through an opening in the divider, into the motor compartment, and over the electric motor; and
   a frequency converter which converts one type of alternating current to another type of current required by the electric motor and which supplies drive energy to the electric motor, the frequency converter being located in the handle part and having a cooling surface thereof located in the cooling air path.

10. The electric tool as recited in claim 9, wherein the motor is a brushless and slipring-less motor, and wherein the frequency converter has an input side which is configured to be coupled to a source of a single phase alternating current and an output side which is coupled to the motor and which supplies a type of current that is required by the motor and that has a higher frequency than line frequency.

11. The electric tool as recited in claim 9, further comprising a vibration damping arrangement which damps vibration transmissions to the handle part from the motor housing part, thereby damping vibration transmissions to the frequency converter.

12. The electric tool as recited in claim 11, wherein the vibration damping arrangement comprises a plurality of discrete vibration dampers.

13. The electric tool as recited in claim 12, wherein the vibration dampers comprise rubber buffers located between the motor housing part and the handle part.

14. The electric tool as recited in claim 9, wherein the divider is formed from a wall of the motor housing part.

15. The electric tool a recited in claim 9, wherein the entire frequency converter is located in the cooling air path.

16. The electric tool as recited in claim 9, wherein the frequency converter is mounted on the handle part at a location which is spaced apart from the divider.

17. A hand-held electric tool comprising:
   a brushless and slipring-less motor electric motor;
   a housing including a motor housing part and a separate handle part that are connected to one another, the handle part being connected to the motor housing part so as to be thermally decoupled from the motor housing part and vibrationally damped from the motor housing part, a motor compartment being formed in the motor housing part, being bordered on one side thereof by a wall that faces the handle part, and housing the electric motor, and a cooling air path extending from an opening in an exterior surface of the handle part, through an opening in the motor compartment wall, into the motor compartment, and over the electric motor; and
   a frequency converter which supplies drive energy to the electric motor, the frequency converter 1) being located entirely within and mounted on the handle part, 2) having a cooling surface thereof located in the cooling air path, 3) having an input side which is configured to be coupled to a source of a single phase alternating current, and 4) having an output side which is coupled to the motor and which supplies a type of current that is required by the motor and that has a higher frequency than line frequency.

18. The electric tool as recited in claim 17, wherein the handle is vibrationally damped from the motor housing part by a damping arrangement that comprises a plurality of discrete vibration dampers located between the motor housing part and the handle part.

19. The electric tool a recited in claim 17, wherein the entire frequency converter is located in a portion of the cooling air path located within the handle part.